J. L. POLLOCK.
LOCK.
APPLICATION FILED DEC. 12, 1912.
1,124,515.
Patented Jan. 12, 1915.
2 SHEETS—SHEET 1.
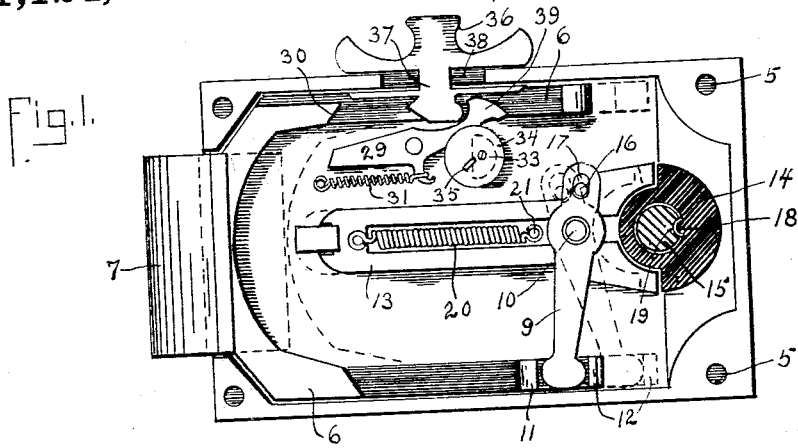
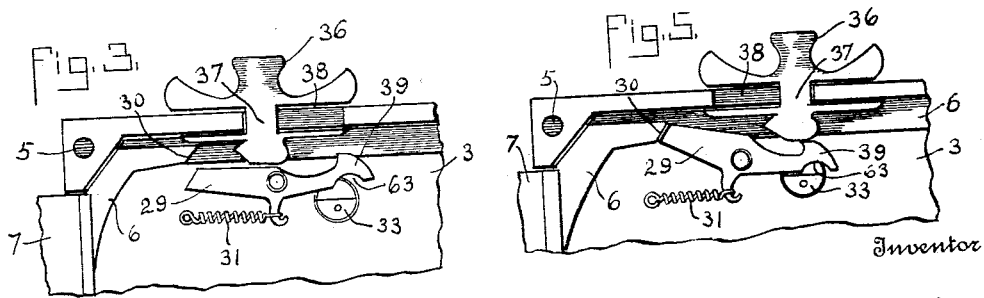
Witnesses
A. T. Scovill.
H. J. Houtzinger.
Inventor
John Lewis Pollock,
By Walter N. Haskell,
his Attorney

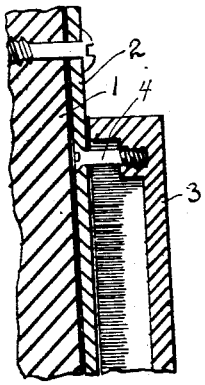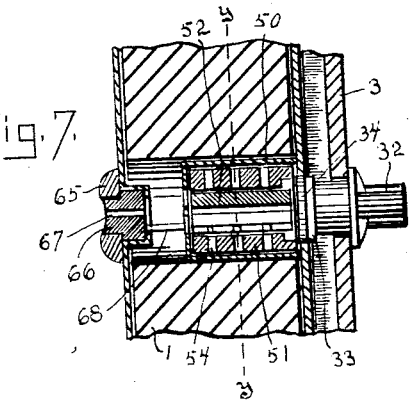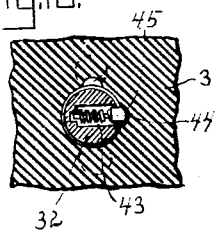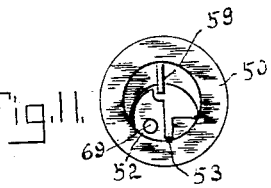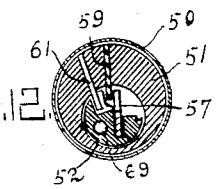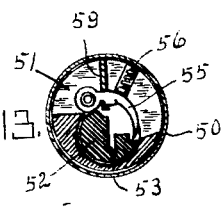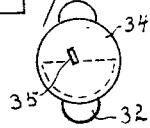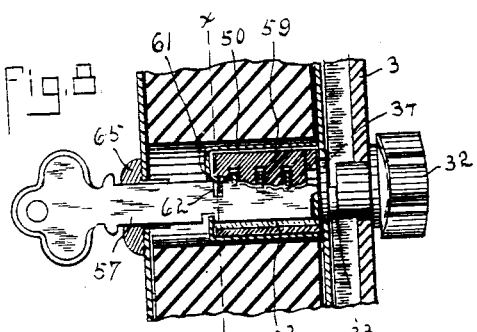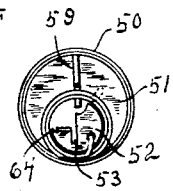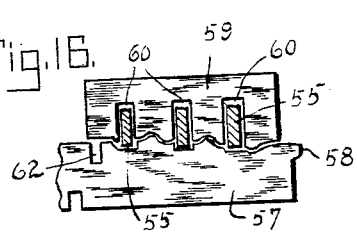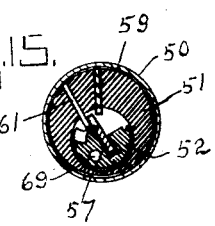

UNITED STATES PATENT OFFICE.

JOHN LEWIS POLLOCK, OF STERLING, ILLINOIS.

LOCK.

1,124,515.   Specification of Letters Patent.   Patented Jan. 12, 1915.

Application filed December 12, 1912. Serial No. 736,271.

*To all whom it may concern:*

Be it known that I, JOHN LEWIS POLLOCK, a citizen of the United States, residing at Sterling, in the county of Whiteside and State of Illinois, have invented certain new and useful Improvements in Locks, of which the following is a specification.

My invention has reference to locks, of that class which are commonly employed in connection with doors, to hold them in closed position, the chief purpose of my device being to attain a greater simplicity of construction and efficiency of operation, and whereby the usual door-bolt, latch and night-lock are combined in one latch.

Other features consist in a novel construction of the retaining case for the lock mechanism, which can be quickly applied to the face of the door, with little cutting away of the material thereof; also a strike for the latch which can be readily adjusted to casings of varying thickness, and which can be applied without providing a mortise in the door jamb, but by merely removing a small portion of the edge of the jamb and casing.

In my invention the latch is manipulated entirely by operation of the door-knob, the novel parts thereof pertaining largely to mechanism for permitting or preventing the action of the latch, as may be desired.

In the drawings: Figure 1 is an inner face view of the casing of the latch and mechanism contained therein. Fig. 2 shows my device in medial longitudinal section in position on a door. Figs. 3 to 5 are details of the locking mechanism. Fig. 6 shows one of the nuts 27, detached. Fig. 7 is a horizontal medial section of the key mechanism. Fig. 8 is a vertical longitudinal section of the key devices, with the key in position therein. Fig. 9 is a detail showing the manner of securing the casing to the escutcheon. Fig. 10 is a section through the thumb-turn 32 and casing adjacent to the same. Fig. 11 is an inner end view of the case containing the key mechanism. Fig. 12 is a vertical cross-section in the line *x—x* of Fig. 8. Fig. 13 is a cross-section in the line *y—y* of Fig. 7. Fig. 14 is an inner end view of the key mechanism. Fig. 15 is a view similar to Fig. 12, with the key partly turned in the lock. Fig. 16 is an enlarged detail of the ward-comb and portion of the key corresponding therewith. Fig. 17 is a detail of the disk 34.

1 indicates a section of an ordinary door, to the inner face of which is secured an escutcheon 2, to which is attached a casing 3, by means of screws 4, (Fig. 9) held in the plate 2 and engaging threaded recesses 5 projected partially through the casing. The outer face of the casing thus presents an unbroken surface.

Slidable in the casing 3 is a frame 6, provided at its outer end with a latch 7, having play in a recess 8 in the edge of the door.

A lever 9 is fulcrumed on a pin 10 fixed in the casing 3, the long end of said lever being engaged by lugs 11 and 12 on the frame 6.

Slidably supported between the lever 9 and casing 3 is a bifurcated bar 13, the ends of which are engaged by the shoulders of a cam 14 held on the spindle 15. The lever 9 and slide bar 13 are connected by means of a pin 16 on said bar having play in a slot 17 in the short arm of the lever.

The cam 14 is held from turning independently upon the spindle by means of a rib 18 on the interior of the cam engaging a groove 19 in the spindle.

A rocking movement of said spindle in either direction operates to give the bar 13 a longitudinal movement outwardly, imparting a rocking movement to the lever 9, and drawing the latch 6 inwardly, as shown in broken lines in Fig. 1. The return of the bar 13 and frame 7 to their former positions is caused by a contractile coiled spring 20 attached at one end to the bar 13 and at the other to a pin 21 fixed to the inner face of the casing 3.

The spindle 15 is held in a casing formed of the telescoping parts 22 and 23, and at its inner end said spindle is provided with a threaded pin 24 passing through a perforated web 25 in the central opening of a handle 26, the outer end of the pin being provided with nuts 27, preferably of the form shown in Fig. 6, and capable of being turned on the pin by means of a tool of suitable construction. The outer nut 27 serves as a locknut to prevent loosening of the parts.

The end of the opening in the handle 26 is closed by a short screw 28. The handle on the outer end of the spindle 15 is rigidly fixed thereto, and when the parts are assembled a solid handle for the door is provided. By means of the telescoping casing therefor, such handle can be readily adjusted to doors of varying thicknesses.

Pivoted in the upper part of the casing 3 is a lever 29, one end of which is adapted to engage a shoulder 30 on the frame 6, and lock such frame from inner movement, as shown in Fig. 5. Contact of the end of the lever with the shoulder is compelled by means of a contractile coiled spring 31, fixed at one end to a hook on the lever 29 and at the other end to a pin in the casing.

Having rotation in the casing 3 is a thumb-turn 32 provided with a semi-circular cam 33 on its inner end, and fixed to such cam is a disk 34, provided with a slot 35, the function of which will be hereinafter set forth. When the cam 33 is placed with its straight face in a vertical position, as shown in broken lines in Fig. 1, it operates to lock the lever 29 out of engagement with the frame, and the latch is free to act at all times. A quarter-turn of the button 32 releases the rear end of the lever and permits the same to operate.

36 indicates a thumb-slide, depending from which is a dog 37, movable in a slot 38 in the casing 3. When at the inner end of the slot the dog 37 engages a head 39 on the lever 29, and holds such lever in bolted position. (Fig. 5.) When at a central point in the slot, as shown in Fig. 1, the dog 37 does not act upon the lever 29 in any way. When positioned at the forward end of the slot, as in Fig. 3, the dog is in contact with the lever 29 and prevents engagement thereof with the frame 6.

If a person passing outwardly through the doorway desires to lock the door in rear of him, this can be accomplished by setting the dog 37 in the last-named position, and in the closing of the door the movement of the latch and frame inwardly brings the shoulder 30 into contact with said dog, moving the same inwardly to a central position, and releasing the lever 29, which, upon the return movement of the frame 6, engages and holds the same in locked position. The slide 36 has a recess 40 in which is a spring-controlled pin 41, engaging a groove 42 in the casing 3, and holding the slide from accidental movement. The shank of the thumb-turn 32 is similarly provided with a recess 43, in which is a spring-controlled pin 44, adapted to engage one or other of a pair of depressions 45 in the casing 3. (Fig. 10.) By this means the thumb-turn is held in position with the cam 33 in operative or inoperative position, as desired.

46 is a keeper for the latch 7, set in a recess 47 in the door jamb, and connected with said keeper is a strike 48 attached at one edge to the keeper 46 and at the other to the casing 49 of the door. The strike 48 is preferably formed of spring metal, so as to be capable of adjustment to casings of varying thicknesses, as shown in broken lines in Fig. 2. The latch 7 has its inner face beveled or curved, so as to be self-acting when it comes in contact with the strike, and the face of the strike is oppositely inclined, so as to facilitate the action of the latch, in seating.

In a latch of this kind it is desirable to provide a means for actuating the same from the outside of the door, and this is accomplished in my invention by means of locking devices shown in Figs. 7 to 17 inclusive, and in which 50 indicates a casing, holding a lock 51 in which is rotatably mounted a key-piece 52, provided with a slot 53 for the insertion of a key.

The lock 51 has a plurality of transverse recesses 54, in each of which is a dog 55, the ends of which normally engage recesses in the edge of the key-piece 52 and hold the same from turning in an operative direction.

The dogs 55 are held in engagement with said key-piece by means of springs 56 secured between such dogs and the casing 50.

57 represents a key of such conformation that upon being inserted into the key-piece 52 the dogs 55 are successively raised thereby, permitting the turning of the key-piece. At this point in the operation the point 58 of the key is in contact with the disk 34, the center line of the keypiece being substantially in line with the center of said disk. In this position the corrugations on the upper edge of the key correspond with those on the lower edge of a ward-comb 59 mounted in the upper part of the casing 50, and provided with recesses 60 to accommodate the dogs 55. The key 57 can then be turned until it passes the ward-comb and comes in contact with a pin 61 projecting downwardly from the lock 51. (Fig. 15.) In this position the point 58 of the key is in line with the slot 35 in the disk 34, such disk being in the position shown in Fig. 17, and at which time the lever 29 and cam 33 are in the position shown in Fig. 5. The key is then introduced a little farther into the lock, the point 58 entering the slot 35, and bringing a recess 62 in the key 57 into line with the pin 61. A further turning movement of the key is thus permitted, such movement resulting in the rotation of the disk 34 and cam 33, until the lever 29 is released, permitting the opening of the door.

The lower edge of the lever 29 may be provided with a recess 63, so as to permit a partial movement of the cam 33 before the lever is actuated thereby. Such construction will render it more difficult to pick the lock by use of a wire or other device.

When the key 57 is withdrawn from the lock the key-piece 52 is returned to its normal position by means of a spring 64 at the inner end thereof.

65 is a key-plate in which is held a rotatable key-guide 66 having a key-way 67 in line with the key slot 53, the alinement thereof being maintained by means of a pin 68 fixed in the key-piece 66 at one end and slidable in an opening 69 in the key-piece 52 at its opposite end. The key-pieces 66 and 52 are coincidently rotated by the action of the key 57, and upon the withdrawal of the key the part 66 is returned to its normal position by the movement of the key-piece 52. The pin arrangement also enables the parts to be adjusted to doors of varying thicknesses.

It will be seen that when the thumb-slide 36 is in position at the inner end of the slot 38, as shown in Fig. 5, it is impossible to operate the latch mechanism from the outside of the door.

At the edge of the door the casing 3 is turned inwardly and is given a slight bevel to correspond with the bevel which is usually given to the edge of the door. This facilitates the opening and closing of the door and permits a close contact of the casing with the strike 48 when the door is closed.

What I claim as my invention, and desire to secure by Letters Patent of the United States, is:

1. A lock for doors, comprising a casing; a U-shaped latch-frame slidably held therein; a longitudinally slotted bar slidably supported in said casing intermediate the arms of said latch-frame; means for suitably actuating said bar, to cause a reciprocation thereof; a lever fulcrumed in said casing on the central line of said bar, and connecting said bar with one of the arms of said latch-frame; and means for holding said frame normally in outward position.

2. A lock for doors, comprising a casing; a latch frame slidably mounted therein and provided with a latch; a bar slidably supported in said casing centrally of said frame; means for suitably reciprocating said bar; means for imparting the movement of said bar to said frame in a contrary direction, and with an increased amount of throw; and means for holding said frame and latch normally in outward position.

3. In a device of the class named, a casing adapted to be secured to the face of a door; a latch-frame slidably held therein; a bar slidably held in said casing; a spindle journaled in said casing and adapted to actuate said bar; a lever fulcrumed in said casing and connecting said bar and said frame, so as to impart the movement of said bar to said frame in a contrary direction; means for holding said frame normally in outward position; a lever adapted to hold said frame in outward position; a spring adapted to hold said last-named lever in engagement with said frame; a thumb-turn adapted to engage said lever and move it out of locking position; and a thumb-slide mounted in said casing, and adapted to lock said last-named lever in locked or released position, as desired.

4. A lock for doors, comprising a casing; a frame slidably held therein, and provided with a latch; a bar slidably supported in said casing; a spindle supported in said casing and provided with suitable handles; a cam on said spindle adapted to reciprocate said bar upon a partial rotation of said spindle; a lever fulcrumed in said casing and connecting said bar and frame, so as to impart the movement of the former to the latter in a contrary direction and with an increased throw; means for holding said frame normally with said latch in position outwardly; a keeper for said latch; and a strike adjacent to said keeper, and provided with an outwardly beveled face.

5. In a lock for doors, a casing adapted to be attached to the door; a frame slidably held therein and provided with a latch; means for suitably actuating said frame to operate said latch; means for holding said latch normally in outward position; a spring-controlled lever adapted to engage said frame, and hold same in locked position, with the latch outwardly; a thumb-turn, adapted to hold said lever out of engagement with said frame; and a thumb-slide mounted in said casing, and capable of holding said lever in a locked or released position, as desired.

6. In a lock for doors, a casing adapted to be attached to the door; a latch-frame slidably held therein; means for suitably actuating said frame; means for holding said frame normally with the latch in outward position; a spring-controlled lock-lever fulcrumed in said casing conveniently to said frame; a thumb-slide mounted in said casing and adapted to hold said lever in a locking or released position; and a projection on said frame, adapted to be engaged by said lever and lock said frame in outward position, and also capable of operating said thumb-slide, when moved inwardly, to return said thumb-slide to a neutral position, and permit said lever to act.

7. In a device of the class named, comprising a casing; a latch-frame slidably held therein; means for actuating said frame; means for holding said frame normally in position with the latch outwardly; a spring-controlled lock-lever, fulcrumed in said casing, and adapted to engage said frame, and hold the latch in outward position; a thumb-turn, rotatably held in said casing and adapted to move said lever from locking position; means for operating said thumb-turn from the outer side of the door and key-engaging means on the inner end of said thumb-turn.

8. A device of the class named, comprising a casing adapted to be attached to a door; a latch-frame slidably held therein; means for suitably actuating said frame; means for holding said frame normally in outward position; a spring-controlled lever fulcrumed in said casing, adapted to engage said frame and lock the same in outward position; a thumb-turn, rotatably held in said casing and adapted to move said lever from a locking position; a disk on the inner end of said thumb-turn, provided with key-engaging means; a lock supported adjacent to said disk; and a key, adapted to enter said lock and engage said disk, to cause the movement thereof.

In testimony whereof I affix my signature in presence of two witnesses.

JOHN LEWIS POLLOCK.

Witnesses:
W. N. HASKELL,
W. P. PALMER.

Copies of this patent may be obtained for five cents each, by addressing the "Commissioner of Patents, Washington, D. C."